No. 849,718.

PATENTED APR. 9, 1907.

G. BEYER.

CLUTCH PULLEY.

APPLICATION FILED JAN. 19, 1907.

WITNESSES:

C. M. Albee.

E. L. Stein

INVENTOR

George Beyer

BY G. H. Albee.

ATTORNEY

THE NORRIS PETERS CO., WASHINGTON, D. C.

UNITED STATES PATENT OFFICE.

GEORGE BEYER, OF NEW LONDON, WISCONSIN.

CLUTCH-PULLEY.

No. 849,718. Specification of Letters Patent. Patented April 9, 1907.

Application filed January 19, 1907. Serial No. 353,068.

*To all whom it may concern:*

Be it known that I, GEORGE BEYER, a citizen of the United States, residing at New London, in the county of Waupaca and State of Wisconsin, have invented a new and useful Improvement in Clutch-Pulleys, of which the following is a specification.

My invention relates to a clutching device for pulleys, and more particularly those for driving-machines of various kinds which require to be run at a particular and uniform speed without regard to variations in the speed of the prime mover, such as cream-separators driven by a gasolene-engine; and it comprises a hub and sleeve adapted to be secured upon the main shaft of an engine, it having near one end a circular flange provided at its circumference with a surface, preferably a beveled surface, adapted for frictionally engaging a corresponding surface upon a loose pulley, the aforesaid sleeve being provided with screw-threads and a nut and washer at its free end, between which and the aforesaid friction-surface the pulley is loosely mounted, the pulley having a friction-surface arranged for engaging the friction-surface of the aforesaid flange and being also provided with springs, the resiliency of which can be increased or diminished by the turning of the aforesaid nut for pressing the friction-surfaces of both the flange and pulley together, the pulley being further provided with a plurality of levers which are hinged to it in such a manner as to receive the centrifugal action of the revolutions of the pulley, while said action of the levers forces the flange and pulley apart, the combined effect of the action of the centrifugally-acted-upon levers and of the springs governing the rate of speed at which the pulley will transmit its power to the machinery being driven by it.

The device is illustrated in the accompanying drawings, in which—

Figure 1:
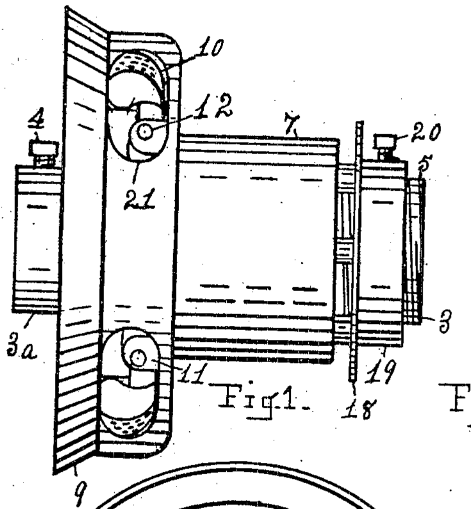
Figure 2:
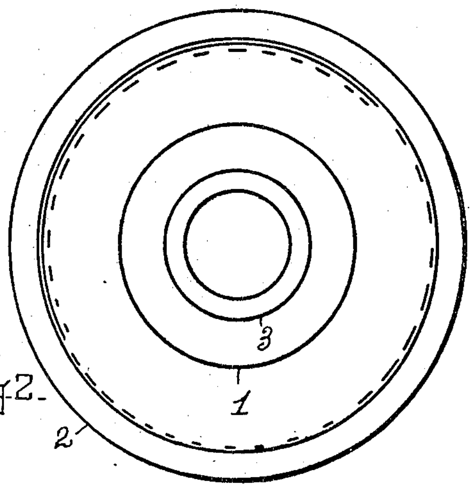
Figure 3:
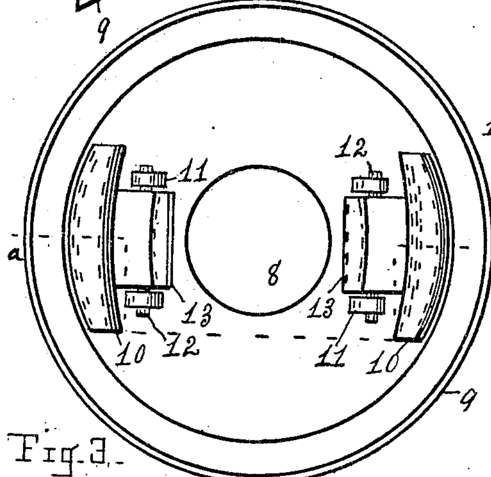
Figure 4:
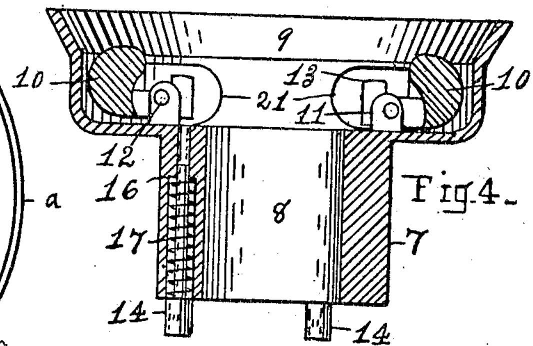
Figure 5:
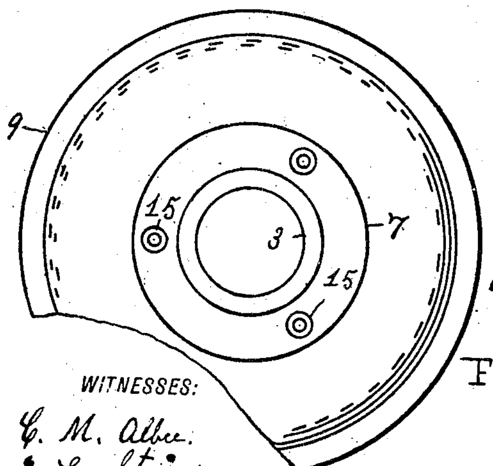
Figure 6:
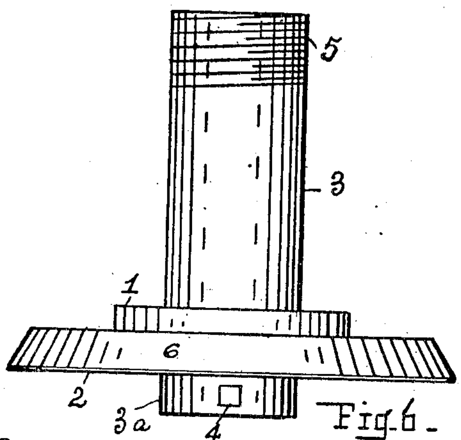

Figure 1 is a side elevation of the complete device. Fig. 2 is a plan of the fixed sleeve and its flange. Fig. 3 is a plan of the loose pulley part, inverted. Fig. 4 is a vertical section of Fig. 3 on line *a a*, Fig. 3. Fig. 5 is a plan of the loose pulley end of the clutch-pulley with the nut and washer upon the end of the sleeve omitted. Fig. 6 is a side elevation of the hub, its flange, and sleeve.

Similar numerals and letters indicate like parts in the several views.

1 indicates the hub of a flange 2, having an extension of a hub of less diameter or a sleeve 3 and $3^a$ upon each side of the flange. The sleeve $3^a$ is not a necessity, but is here shown as having a set-screw 4 for securing the hub to a shaft; but some other location for the securing means may be selected and said sleeve omitted. The sleeve 3 is extended to some length, turned off, and provided with threads 5 at its outer end. The outer end of the hub 1 is turned off for a purpose to be described hereafter. The outer circumference of the flange 2 is turned off for forming a friction-surface 6, preferably to a beveled form, but not necessarily with as great a bevel as shown, as a flat face may be used, but not with as satisfactory results.

7 indicates a pulley having a bore 8 for fitting the sleeve 3 and at one end is provided with a flaring friction-flange 9 and centrally of the pulley with levers 10, the levers being hinged to the ears 11 of the flange with pins 12, and being provided upon their shorter ends with elevations 13, which when the pulley is placed in position on the sleeve will be in position for engaging with the end face of the hub 1 whenever the centrifugal action upon said levers throws their long ends outward, said throwing outward of the levers acting by the engagement of their elevations 13 with the end face of the hub to separate the friction-surfaces of the flanges 2 and 9.

Arranged in the end of the pulley are spiral spring-pins 14, holes 15 being drilled through the pulley and then counterbored to the point 16 for receiving springs 17. A washer 18 is arranged on the sleeve to engage the ends of said springs, and when the round nut 19 is screwed upon the threads against the washer it will compress said springs and at the same time draw the friction-faces of the flanges 2 and 9 together. It will be observed that while the springs draw the friction-surfaces together the centrifugal action of the levers throws them apart, and as there will always be a little slipping between said surfaces the rate of speed at which the pulley will run will depend both on the tension of the springs and the throwing outward of the longer and heavier ends of the levers, which latter action is necessarily governed by the speed at which the pulley is revolved. By screwing the nut onto the sleeve the friction-surfaces are brought more tightly together and the speed of the pulley thereby increased, and by screwing it off it will be decreased. When the nut has been adjusted to the speed desired, it can be secured in position by means of the set-screw 20. Should it then be too fast or too slow, the operator has but to loosen the set-screw and readjust the nut. When once the desired speed is obtained, the pulley will continue to run at that speed regardless of the speed (within reasonable limits) of the prime mover and transmit the power to the desired mechanism.

21 indicates openings near the circumference of the pulley-flange for providing access to the hinge-pins 12. In the drawings the pulley is of less diameter than the flange; but this proportion between the diameters of pulley and friction-surface may be reversed on pulleys of larger diameter as circumstances require.

Having described my invention, what I claim, and desire to secure by Letters Patent, is—

1. A clutch-pulley, comprising a hub adapted to be secured upon a shaft, a flange extending outward around the hub having its outer circumference formed into a friction-surface, a second hub or sleeve of a lesser diameter than that of the first-mentioned hub extending outward therefrom, a screw-thread formed upon the outer end of said smaller sleeve, a nut adapted to be screwed upon said threads, a washer arranged upon said smaller sleeve inside of said nut, a pulley loosely mounted upon said smaller sleeve between said washer and flange, a flaring flange extending outward around said pulley from one end thereof, the outer portion of the circumference of said flaring flange being a friction-surface corresponding with the friction-surface of the first-named flange, a plurality of levers hinged to the inside of said second-named flange so as to have a short and light inner end and a longer and heavier outer one, said inner ends being arranged for engaging the end face of the first-named hub by reason of the centrifugal action of the pulley upon the outer end of said levers as the pulley is revolved, and thereby separate the friction-faces of said second and first named flanges, a plurality of springs arranged in the outer end of said pulley adapted to be compressed by the screwing of said nut upon the sleeve against said washer for increasing the friction between the friction-faces of said second and first mentioned flanges, and a set-screw arranged in said nut for its retention in the desired position upon said sleeve.

2. A clutch-pulley, comprising a hub adapted to be secured upon a shaft, a flange extending outward around the hub having its outer circumference formed into a beveled friction-surface, a second hub or sleeve of a lesser diameter than that of the first-mentioned hub extending outward therefrom, a screw-thread formed upon the outer end of said smaller sleeve, a nut adapted to be screwed upon said threads, a washer arranged upon said smaller sleeve inside of said nut, a pulley loosely mounted upon said smaller sleeve between said washer and flange, a flaring flange extending outward around said pulley from one end thereof, the outer portion of the circumference of said flaring flange being a beveled friction-surface corresponding with the friction-surface of the first-named flange, a plurality of levers hinged to the inside of said second-named flange so as to have a short and light inner end, and a longer and heavier outer one, said inner ends being arranged for engaging the end face of the first-named hub by reason of the centrifugal action of the pulley upon the outer ends of said levers as the pulley is revolved, and thereby separate the friction-faces of said second and first named flanges, a plurality of springs arranged in the outer end of said pulley adapted to be compressed by the screwing of said nut upon the sleeve against said washer for increasing the friction between the friction-faces of said second and first mentioned flanges, and a set-screw arranged in said nut for its retention in the desired position upon said sleeve.

GEO. BEYER.

Witnesses:
GILES H. PUTNAM,
MABEL NICHOLSON,
JOHN MARX,
JOHN REMMEL.